United States Patent [19]

Lee

[11] Patent Number: 6,050,875

[45] Date of Patent: Apr. 18, 2000

[54] METHOD OF MAKING A DOLL FACE

[75] Inventor: Min Joo Lee, Seoul, Rep. of Korea

[73] Assignee: Chosun International, Inc., Seoul, Rep. of Korea

[21] Appl. No.: 09/264,771

[22] Filed: Mar. 9, 1999

[30] Foreign Application Priority Data

Dec. 3, 1998 [KR] Rep. of Korea ............................ 23999

[51] Int. Cl.[7] ...................................................... A63H 3/36
[52] U.S. Cl. ............................................ 446/391; 446/268
[58] Field of Search ............................... 446/97, 268, 369, 446/370, 372, 373, 374, 385, 387, 391

[56] References Cited

U.S. PATENT DOCUMENTS

| | | | |
|---|---|---|---|
| 1,942,370 | 1/1934 | Jacobson | 446/97 X |
| 3,354,578 | 11/1967 | Ryan | 446/369 |
| 3,390,482 | 7/1968 | Holtvoigt | 446/268 |
| 4,798,556 | 1/1989 | Vicars et al. | 446/372 X |
| 4,929,213 | 5/1990 | Morgan | 446/97 |

*Primary Examiner*—Sam Rimell
*Attorney, Agent, or Firm*—Handal & Morofsky

[57] ABSTRACT

A method is disclosed for making a doll face comprising providing a fabric with at least one visual feature and placing the fabric, after it has been provided with such a visual feature, proximate to a plastic film to form a fabric and film assembly. The fabric and film assembly is then placed proximate a first heated shaping platen. The fabric and film assembly is driven proximate a first heated shaping platen to adhere the plastic film to the fabric and heat-form of fabric and film assembly into a desired shape having physical features, for example of a doll face. A portion of the adhered film and fabric is cut with a razor or the like to form a doll face. The face may then the incorporated into a doll. In accordance with the preferred embodiment, the fabric and film assembly is driven toward the first heated platen by a second heated shaping platen which is complementary in shape to the first heated shaping platen. The inventive doll head is one made using this process.

22 Claims, 7 Drawing Sheets

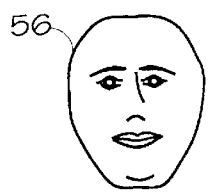
Figure 18
Figure 19
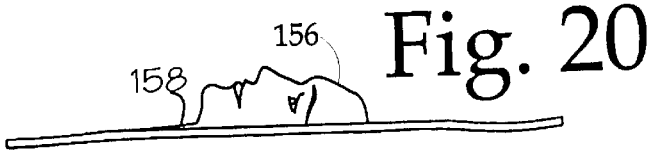
Fig. 20
Fig. 21
Fig. 22
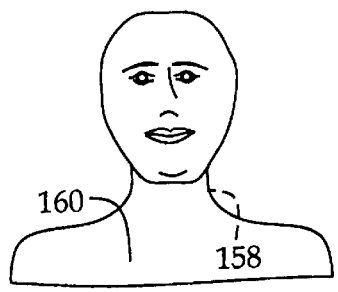 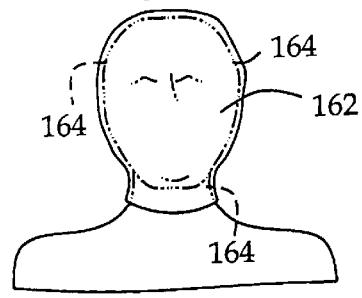
Fig. 23
Fig. 24
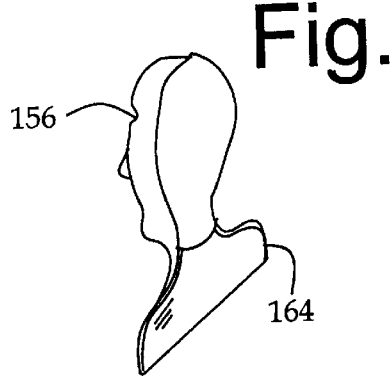 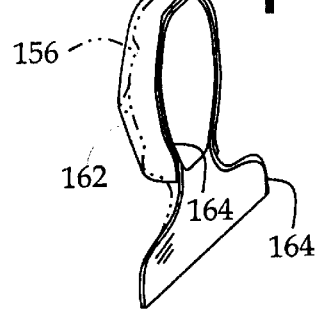

METHOD OF MAKING A DOLL FACE

CROSS REFERENCE TO RELATED APPLICATION

This application discloses subject matter in the general field of Korean Patent Application Serial Number 23999, filed on Dec. 3, 1998, naming Min Joo Lee as the inventor. The disclosure of the aforementioned Korean patent application is hereby incorporated herein by reference thereto.

FIELD OF THE INVENTION

The invention relates to a novel doll head construction and the method of making it, using plastics, fabrics or similar materials.

BACKGROUND OF THE INVENTION

Children's toys, and dolls, in particular, have a history dating back into antiquity. Generally, the technology surrounding the manufacture of dolls centers on creation of an attractive doll face, a miniaturized application of conventional clothier's arts, manufacture of a doll body using plush or other sculptural techniques, and the simulation of the hair with sculptural elements, fibers, or other techniques.

In the case of doll faces, the doll maker has a wide panoply of possible constructions and manufacturing techniques at his disposal. Traditional techniques involved the use of plaster-like materials to cast a doll face. After casting, the doll face was finished, usually using paying, the dye or other similar material to give the face a natural skin color.

As a rule, such cast doll faces include all the normal features of the figure stimulated by the doll. In the case of the human doll, the cast face would most often include the entire head, including well formed lips, teeth, cheeks, nose, chin, ears and forehead. Lives are often given a contrasting reddish color to improve the attractiveness of the face. Likewise, an air brush may be used to apply a patch of rosy hue to the cheeks. Sometimes, eyes are cast in finished form. If they are, the eyes are usually painted. Other times, the casting is made to accommodate a glass eye or an eye made of another material.

Hair is often molded into the doll head especially in older plaster doll heads. More recently, plaster has come to be replaced by plastic as this technology came into its own after World War II. Initially, hard plastics were used. The same then new polymeric technology also made synthetic hair fiber a practical alternative in the mass production of dolls. Typically, such fibers were mounted on a backing to form a wig, which could be glued to the doll head.

While soft rubber-like materials, injection molded into doll heads were seen at least as early as the mid 1950s, the traditional art doll face, made popular for centuries in plaster remained dominant in the marketplace for many years. Moreover, doll faces also retained, for many years, the relatively shiny finish of the plaster versions that preceded them.

In time, however, soft rubber doll faces and doll heads have become an increasingly important part of the market. These products have an increasingly realistic look and feel. Moreover, the nature of these materials has allowed the easier direct mounting of fibrous synthetic hair to the doll head, thus increasing realism. Likewise, recent products even present the possibility of fibrous synthetic eyebrows mounted to a doll's head.

While the ability of the technology to produce increasingly realistic dolls continues to grow, fashion has revitalized more traditional techniques and looks. One of the most enduring forms of dolls is the so-called "rag doll". Indeed, some of these products, such as the Raggedy Ann and Raggedy Andy dolls of our American colonial heritage, have never left us. Traditionally, such dolls were made of plain white linen, which changed to cotton when Eli Whitney's cotton gin made the short staple cotton of the American South a practical commercial product. Despite their homey look, with squarish or oval faces, yarn hair and embroidered facial features, the soft natural feel of the textile render the rag doll one of the most popular dolls in this country.

The increasing popularity of this doll today can be seen from the fact that of the versions of rag dolls have come to be marketed en masse. For example, one finds rabbit rag dolls in many toy departments during the Easter season. However, against the ever increasing realism of alternative doll technologies, rag dolls, despite their tradition and tactile and visual karma, simply do not appeal to a major segment of people.

SUMMARY OF THE INVENTION

It is an object of the present invention to preserve the desirable characteristics of rag doll products, while still improving the ability of the dolls to simulate reality. The same is achieved by the incorporation of a flexible resinous material into a textile fabric in order to impart a sculptural shape to the material, while still retaining the relatively supple, soft and natural feel of the fabric head of a rag doll. While it is contemplated that the subject technology may be employed with dolls having hair made of yarn, the added realism will also provide esthetic support for fibrous hair.

DETAILED DESCRIPTION OF THE PREFERRED EMBODIMENTS

The above and the other objects and advantages of the invention will become apparent from the detailed description of the invention which appears below and from the following drawings, in which:

FIG. 18 is a right elevational view of the doll face and adjoining fabric along lines 18—18 of FIG. 17;

FIG. 19 is a front view of a finished doll face cut from the doll face and adjoining fabric illustrated in FIG. 17;

FIG. 20 is a view similar to that of FIG. 18 illustrating a doll face formed with a neck and torso portion;

FIG. 21 is a front view of a finished doll face cut with a razor or other similar implement from the formed face and torso illustrated in FIG. 20;

FIG. 22 is a front view showing the formation of a doll head during the sewing of a fabric to the formed face and torso illustrated in FIG. 21;

FIG. 23 is a perspective view from the rear of the formed doll face and torso illustrated in FIG. 22; and FIG. 24 is a perspective view, similar to that of FIG. 23, but showing the fabric stretched around and brought behind the back of the formed doll head.

DETAILED DESCRIPTION OF THE BEST MODE OF THE INVENTION

Figure 1:
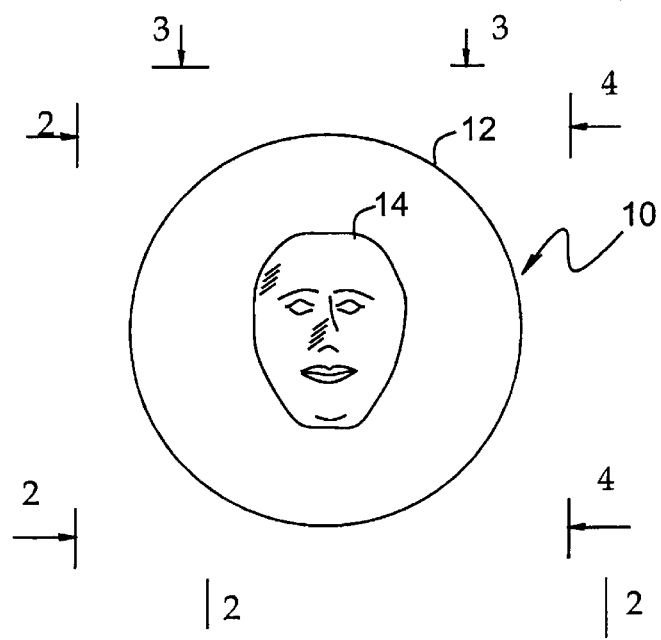
FIG. 1 is a plan view of a convex platen, which is preferably heated, for forming a doll face in accordance with the present invention.
Figure 8:
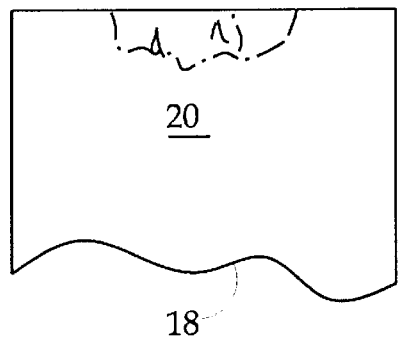
FIG. 8 is a rear view of the platen of FIG. 1 along lines 8—8 of FIG. 5.
Figure 7:
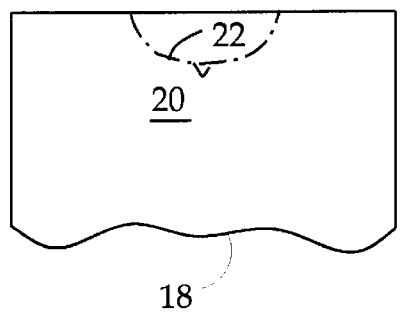
FIG. 7 is a right side elevational view along lines 7—7 of FIG. 5.
Figure 6:
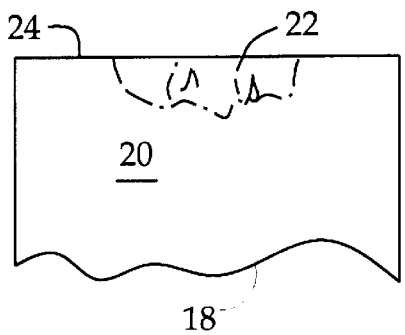
FIG. 6 is a left side elevational view of the platen of FIG. 1 along lines 6—6 of FIG. 5.

In accordance with the method of the present invention, a doll face is constructed using a pair of dies. In particular, the first of these dies is a convex die 10, as illustrated in FIG. 1. Die 10 comprises a base 12 and a convex or positive shaping member 14. For purposes of this application, the discussion of a doll will be done in the context of a human baby doll, but it is understood that the techniques of the invention may be applied to other types of dolls.

Figure 4:
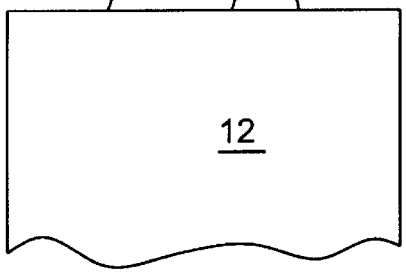
FIG. 4 is a rear view of the platen of FIG. 1 along lines 4—4 of FIG. 1.
Figure 3:
FIG. 3 is a right side elevational view along lines 3—3 of FIG. 1.
Figure 3:
Figure 2:
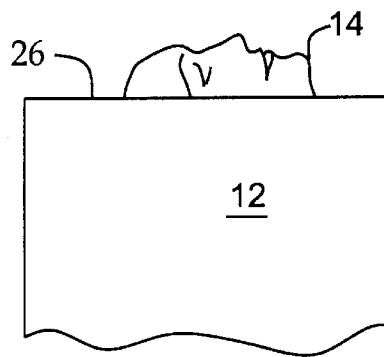
FIG. 2 is a left side elevational view of the platen of FIG. 1 along lines 2—2 of FIG. 1.

As can be seen in FIGS. 2–4, positive shape forming member 14 essentially takes the form of the doll head or other object which one wishes to form. Accordingly, in accordance with the present invention, positive shape forming member 14 includes a nose 16, and all the other features necessary to form a human face. As can be seen from the two side views and the top view of the positive shape forming member 14, as illustrated in FIGS. 2–4, the same is configured in three dimensions to form a relatively realistic three-dimensional representation of the human face.

In similar fashion, the mating concave die 18 is illustrated in FIGS. 5–8. Mating concave die 18 also comprises a base 20 and a concave or negative shape forming cut-out 22. As can be seen from FIGS. 5–8, the shape of cut-out 22 is formed to conform to the shape of positive shape forming member 14 when it is covered with a doll face formed of the material used to make the inventive doll face, as will be described below. More particularly, when the top surface 24 of base 20 is separated from the surface 26 of base 12 by a distance equal to the thickness of the material from which the inventive doll face is made, the outside surface 28 of positive shape forming member 14 is separated by the same distance from the shaping surface 30 of negative shape forming cut-out 22.

Figure 9:
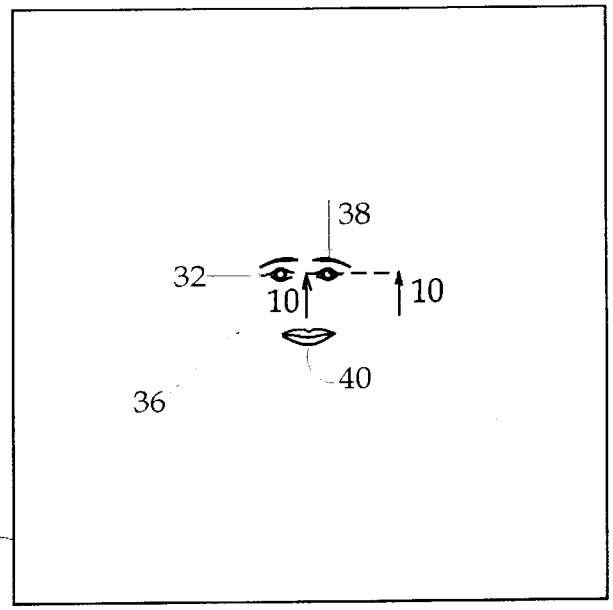
FIG. 9 is a plan view of a patch of fabric bearing certain doll face elements in accordance with the present invention.

In accordance with the present invention, a face 32 is embroidered into a patch of fabric 34, as illustrated in FIG. 9. It is noted that not all the features of the face to be formed are embroidered. In particular, only the eyes 36, eyebrows 38 and lips 40 are embroidered in the case of the embodiment of the invention illustrated in FIG. 9. Of course, other features may be embroidered, and this is left to the imagination of the individual complying the invention, depending upon the esthetic effects which he wishes to achieve. Other features, such as the nose, chin, cheeks and forehead are achieved in accordance with the heat forming process described below.

Fabric 34 is selected for its ability to be formed into a desired shape when pressed between two shape forming surfaces. In accordance with the preferred embodiment of the invention, fabric 34 is a stretchable fabric having a velour-like outer surface, meant to simulate the human skin. Fabric 34 has a thickness of approximately 0.015 inch.

Figure 10:
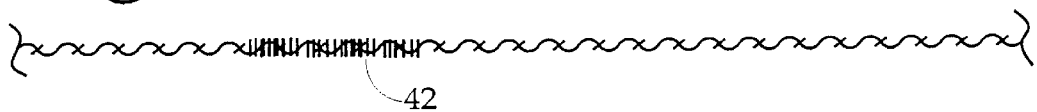
FIG. 10 is a cross-sectional view along lines 10—10 of FIG. 9 showing the placement of stitches in the fabric of FIG. 9.

As is illustrated in FIG. 10, embroidery of a conventional nature comprises a plurality of stitches of thread 42, whose color and position is selected to simulate the appearance of the sculptural feature which one wishes to achieve, for example an eye, the lips, the forehead, and so forth. Naturally, the finished side of the embroidery is on the velour-like outer skin.

Figure 11:
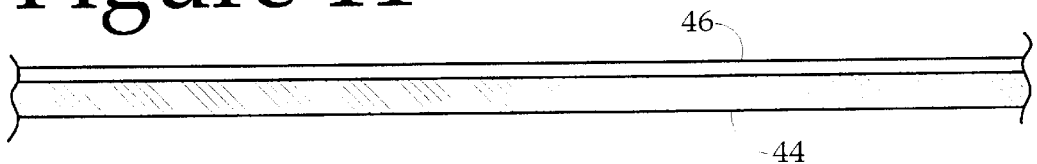
FIG. 11 is a cross-sectional view of a plastic member with a layer of dissolved plastic or glue disposed over it in accordance with a possible embodiment of the present invention.

While, in principle, it is possible to put fabric 34 over a layer of polyvinyl chloride, polyethylene or other plastic film, and then introduced in the sandwich between the pair of heated dies of the type described above. It is contemplated that the fabric 34 may be adhered to a layer of heat-formable plastic film. Such adhesion may be achieved by taking a patch of film 44, as illustrated in FIG. 11, and depositing a layer of glue 46 on top of it. Patch of film 44 has a thickness of approximately 0.036 inch. Fabric 34 may then be adhered to glue 46 to produce the single member which may be transformed into a doll face in accordance with the further process steps described below. The glue used should be of a tape which, when heated, will deform and stretch to take the shape of the doll face. Alternatively, a solvent may be used to turn the top surface of plastic layer of film 44 into a "glue". In the event of such an approach, when the solvent evaporates away, fabric 34 will be adhered to plastic layer of film 44.

Figure 12:
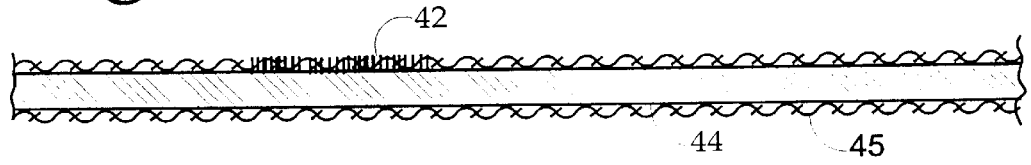
FIG. 12 is a cross-sectional view of the plastic member of FIG. 11 within the fabric of FIG. 10 disposed over it.

Alternatively, fabric 34 may be put adjacent film 44, and a thin fabric layer 45, having a thickness of approximately 0.005 inch, and the two pressed together between two flat heated platens to form a unitary multilayer structure as illustrated in FIG. 12.

Figure 5:
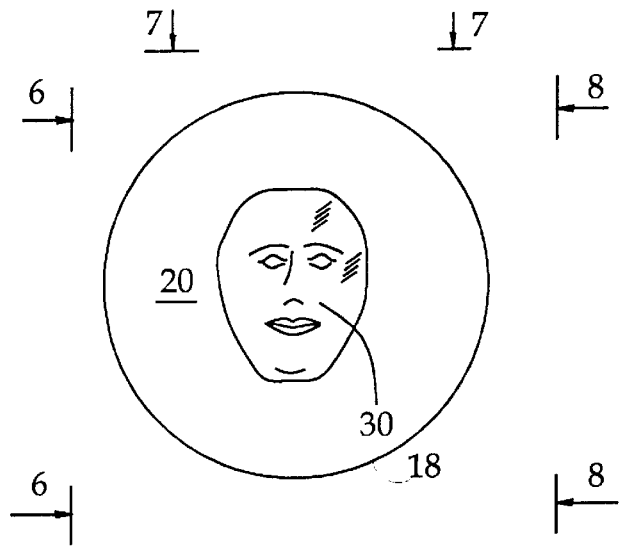
FIG. 5 is a plan view of a convex platen, which is preferably heated, for forming a doll face in accordance with the present invention.
Figure 13:
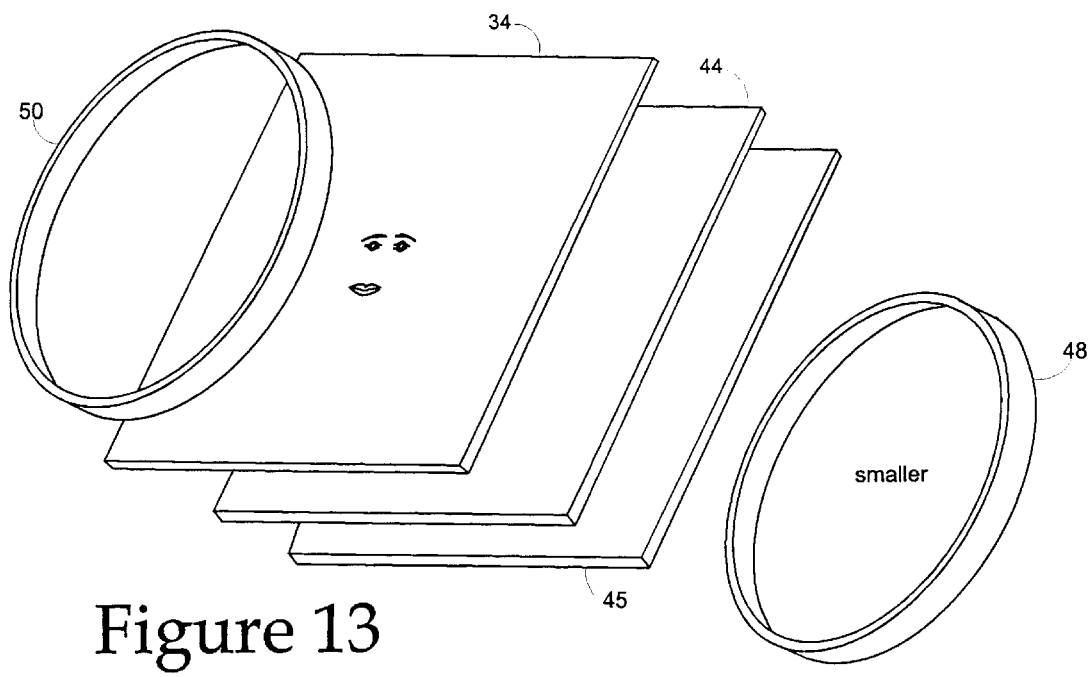
FIG. 13 shows apparatus particularly suited for forming a doll face without the use of glue or dissolved plastic and comprising a frame for holding fabric and plastic in place with respect to each other during a press molding or blow molding operation.

However, as noted above, the simplest technique may be simply to put fabrics 34 and 45, and plastic film 44 in between the two molding heated platens illustrated in FIGS. 1 and 5, but without first applying any sort of adhesion process. The same may be achieved using a frame of the type used for hand embroidery. As shown in FIG. 13, the frame comprises a small cylindrical hoop 48 and a large cylindrical hoop 50. Hoop 48 is dimensioned to fit within hoop 50, with only a small gap between the outside cylindrical surface of hoop 48 and the inside cylindrical surface of hoop 50. The gap is dimensioned to accommodate the thickness of fabric 34 and plastic film 44.

As shown in exploded perspective in FIG. 13, plastic film 44 is placed over smaller hoop 48. Fabric 34, including the embroidered face, is then placed over plastic film 44. It is also possible in accordance with the invention to replace the embroidered face by one made of paint or other like process. After fabric 34 is placed over hoop 48 in a manner which results in it being substantially flat, plastic fill 44 is then placed over fabric 34. Finally, hoop 50 is placed with its center over the center of hoop 48 and hoop 50 is pressed to hold fabric 34 and plastic film 44 tautly in position, in much the same manner as a fabric is held in similar hoops during hand embroidery. The result is to form an assembly 52, as illustrated in FIG. 14.

Figure 14:
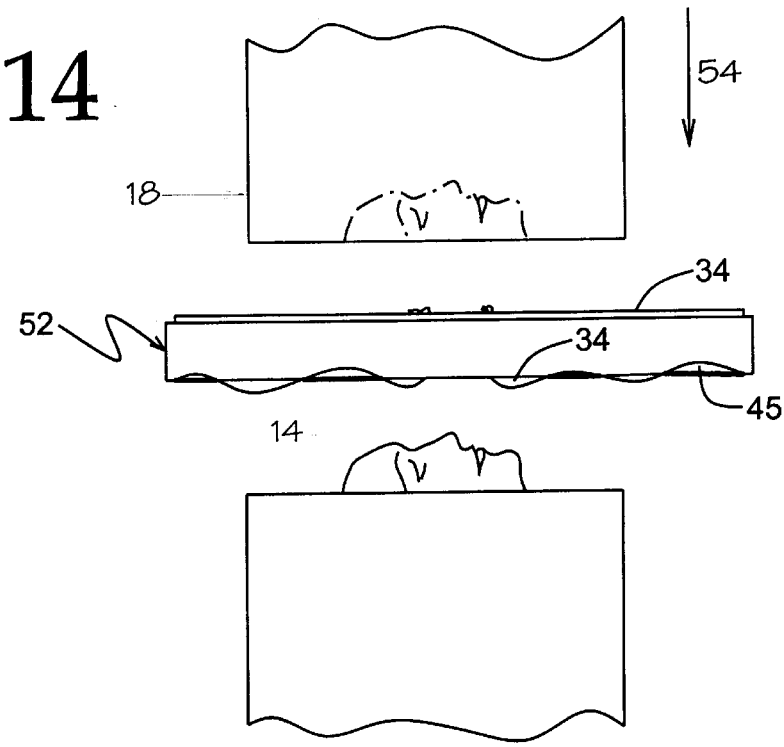
FIG. 14 illustrates fabric and plastic held within the apparatus of FIG. 13 at the beginning of a heated press molding operation.

As shown in FIG. 14, assembly 52 is placed between positive heated platen 14 and negative heated platen 18. It is noted that the internal structure of platens 14 and 18, including the means for heating them, is well-known in the art and thus there is no need to describe here such structures, which do not form part of the invention.

Figure 15:
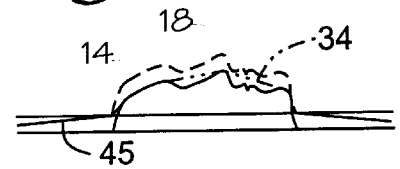
FIG. 15 is a diagrammatic representation of an intermediate portion of the molding operation carried out with the apparatus of FIG. 14.

In accordance with the invention, negative heated platen 18 is advanced in the direction of arrow 54 toward positive heated platen 14. The result is that the sandwich of fabric 34 and plastic film 44 is, initially, stretched around the positive shape forming portion of positive heated platen 14, as illustrated in FIG. 15. As heated negative platen 18 continues to advance toward heated positive platen 14, the result is that the features of the shape forming portion of negative platen 18 forced all portions of fabric 34 and plastic film 44 to stretch, bend and flow until they are in absolute conformity with the shape forming portion of the positive platen. The same is promoted by the fact that the platens are heated. Heating tends to make plastic film 44 liquify into a viscous liquid that, as a result of being pressed between platens 14 and 18 is caused to flow, to a limited extent, into the adjacent surface of fabric 34, thus resulting in its adhering to the fabric, acting as a shape forming member by providing rigidity, and maintaining the stretching and bending in parted to fabric 34 during the heat forming process described above. The result is the embossed face illustrated in FIG. 16.

It is also noted that the heated platen press forming technique may be replaced by any process suitable for forming plastic film, such as blow molding or like.

Figure 16:
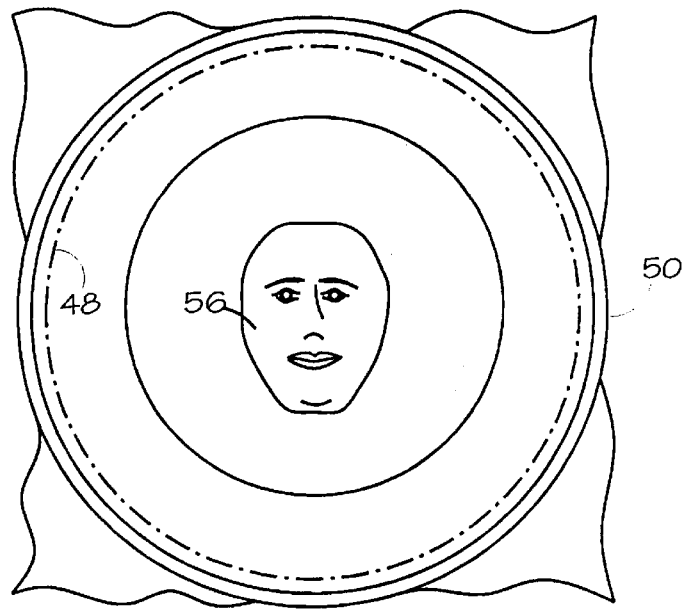
FIG. 16 is a plan view showing a doll face formed within the apparatus of FIG. 13.
Figure 17:
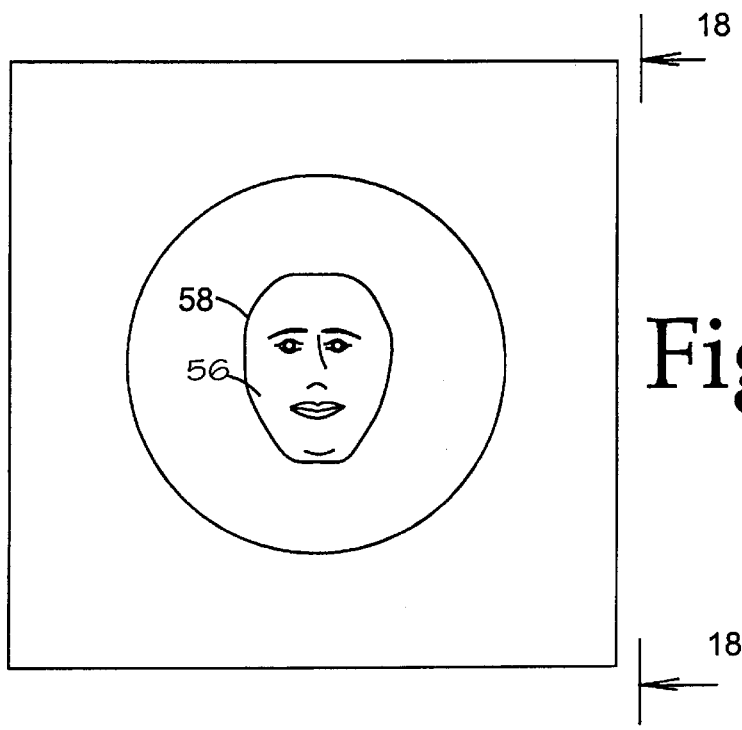
FIG. 17 is a plan view of the doll face and adjoining fabric removed from the apparatus of FIG. 13.

After the face is embossed as shown in FIG. 16, the embossed face 56 may be removed, as illustrated in FIG. 17. To obtain a clear understanding of the embossed face 56, the same is illustrated in cross-section in FIG. 18. After the embossed face 56 has been removed from the hoops, all that remains necessary is for the face to be cut away at its baseline 58. The result is the finished face illustrated in FIG. 19.

Alternatively, a finished embossed face 156 may be manufactured having a neck 158, as illustrated in FIG. 20. In addition, as illustrated in FIG. 21, even the upper torso 160 of the doll may be manufactured to the same is to be exposed in whole or in part, for example, under a blouse, or a pair of the straps of an overall.

The head of a doll may be constructed in any one of a number of ways, but one particularly advantageous way of doing tis is illustrated in FIGS. 22 and 23. In accordance with this technique, a patch of material 162 is draped over face 156 to be formed into the head of the doll. Patch of material 162 is selected for its ability to stretch very greatly. Patch of material 162 is then sewn to the finished face 156 around the periphery 164 of the face. As can be seen in FIG. 23, the result is to cover face 156. After such sewing has been completed, the inside of the head is stuffed with a fibrous stuffing material of the type typically used in the industry, or with a very soft and very compressible foam rubber material. Patch of material 162 is then stretched up across face 156 and draped over the stuffing to produce a finished doll head, as illustrated in FIG. 24.

While several of embodiments of the invention have been described, it is, of course, understood that various modifications will be obvious to those of ordinary skill in the art. Such modifications are within the spirit and scope of the invention which is limited and defined only by the appended claims.

What is claimed is:

1. A method of making a doll face, comprising the steps of:
   (a) providing a fabric with at least one visual feature;
   (b) placing said fabric after it has been provided with at least one visual feature, proximate to a plastic film to form a fabric and film assembly;
   (c) placing said fabric and film assembly proximate a first heated shaping platen;
   (d) driving said fabric and film assembly proximate said first heated shaping platen to adhere said plastic film to said fabric and heat-form said fabric and film assembly into a desired shape having physical features;
   (e) cutting out a portion of said adhered film and fabric to form a face; and
   (f) incorporating said face into a doll.

2. A method as in claim 1, wherein said fabric is provided with a visual feature, by embroidering said visual feature on said fabric.

3. A method as in claim 1, wherein said fabric is provided with a visual feature, by painting said visual feature on said fabric.

4. A method as in claim 1, wherein said fabric and film assembly is provided with a spatial physical feature at a location where there is no visual feature on said fabric, during said step of heat-forming said fabric and film assembly into said desired shape having physical features.

5. A method as in claim 1, wherein said fabric and film assembly is provided with a spatial physical feature at a location where there is a visual feature on said fabric, during said step of heat-forming said fabric and film assembly into said desired shape having physical features.

6. A method as in claim 1, wherein said fabric and film assembly is provided with a spatial physical feature at a location where there is no visual feature on said fabric and where there is a visual feature on said fabric, during said step of heat-forming said fabric and film assembly into said desired shape having physical features.

7. A method as in claim 1, wherein said driving of said fabric and film assembly is performed by a second heated shaping platen, said second heated shaping platen being complementary to said first heated shaping platen.

8. A doll face, comprising:
   (a) a layer of plastic formed with at least one physical feature, said layer of plastic having an inner and an outer surface;
   (b) a layer of fabric having an inner and an outer surface, the inner surface of said layer of fabric being adhered to the outer surface of said layer of plastic and formed by said layer of plastic to have said at least one physical feature; and
   (c) at least one visually contrasting member disposed on the outer surface of said layer of plastic, said at least one visually contrasting member being formed by said layer of plastic, wherein said at least one visually contrasting member is embroidery.

9. A doll face as in claim 8, further comprising a visually contrasting member made of paint.

10. A doll face as in claim 8, wherein said layer of plastic is a thermoformable material.

11. A doll face as in claim 8, wherein said fabric comprises fibers and the outer surface of said layer of plastic is intimately formed around and adhered to the fibers on the inner surface of said layer of fabric.

12. A doll face as in claim 8, wherein said layer of fabric is formed by said layer of plastic to have said at least one physical feature by being at least in part in a stretched state, and by being at least in part in a bent state.

13. A doll face as in claim 8, wherein said layer of fabric is stretchable.

14. A method of making a dollface, comprising the steps of:
(a) providing a film having an upper surface and a lower surface;
(b) providing a first fabric layer having an upper surface with at least one visual feature and a lower surface;
(c) placing said lower surface of said first fabric layer proximate to said upper surface of said film;
(d) providing a second fabric layer having an upper surface and a lower surface;
(e) placing said lower surface of said film proximate to said first upper surface of said second fabric layer to form a unitary multilayer fabric and film assembly;
(f) providing said unitary multilayer fabric and film assembly having an upper surface with at least one visual feature and a lower surface;
(f) providing a first heated shaping platen having a convex surface containing at least one visual feature;
(g) placing said upper surface of said unitary multilayer fabric and film assembly proximate to said convex surface of said first heated shaping platen;
(h) providing a second heated shapen platen having a concave surface containing at least one raised visual feature;
(i) driving said lower surface of said unitary multilayer fabric and film assembly proximate to said convex surface of said first heated shapen platen to adhere said upper surface of said plastic film to said lower surface of said first fabric layer, and driving said upper surface of said unitary multilayer fabric and film assembly proximate said concave surface of said second heated shapen platen to adhere said lower surface of said plastic film to said upper surface of said second fabric layer to heat-form said unitary multilayer fabric and film assembly into a desired shape having physical features;
(j) cutting out a portion of said adhered film and fabric to form a face having at least one visual feature;
(k) incorporating said face into a doll.

15. A method as in claim 14, wherein said unitary multilayer fabric and film assembly is provided with a physical feature at a location where there is no visual feature on said fabric.

16. A method as in claim 14, wherein said unitary multilayer fabric and film assembly is provided with a physical feature at a location where there is a visual feature on said fabric.

17. A method as in claim 14, wherein said unitary multilayer fabric and film assembly film assembly is provided with a physical feature at a location where there is no visual feature on said fabric and where there is a visual feature on said fabric and where there is a visual feature on said fabric.

18. A method as in claim 16, wherein said driving of said unitary multilayer fabric and film assembly is performed by a second heated shaping platen, second heated shapen plated being complementary to said first heated shaping platen.

19. A dollface comprising:
(a) a layer of plastic having an inner surface formed with at least one physical feature and an outer surface;
(b) a layer of fabric having an inner and outer surface, the inner surface of said layer of fabric placed proximate to the outer surface of said layer of plastic and formed by said layer of plastic to have said at least one physical feature;
(c) a second layer of fabric having an inner and an outer surface, the outer surface of said second layer of fabric placed proximate to the inner surface of said layer of plastic and formed by said layer of plastic to have said at least one physical feature; and
(d) at least one visually contrasting member disposed on the outer surface of said layer of plastic, said at least one visually contrasting member being formed by said layer of plastic.

20. A dollface as in claim 19, wherein said second layer of fabric is formed by said layer of plastic to have said at least one physical feature by being at least in part in a stretched state, and by being at least in part in a bent state.

21. A dollface as in claim 17, wherein said second layer of fabric is stretchable.

22. A dollface as in claim 19, wherein said second fabric comprises fibers and the inner surface of said layer is intimately formed around and adhered to the fibers on the outer surface of said second layer of fabric.

* * * * *